United States Patent
Schuster

[15] 3,669,170
[45] June 13, 1972

[54] U-SHAPED CLIP NUT

[72] Inventor: Donald R. Schuster, Columbus, Ohio

[73] Assignee: Westinghouse Electric Corporation, Pittsburgh, Pa.

[22] Filed: June 22, 1970

[21] Appl. No.: 48,058

[52] U.S. Cl. ........................................................ 151/41.75
[51] Int. Cl. ............................................................. F16b 37/04
[58] Field of Search ............... 151/41.75; 24/73 SM, 73 SC, 24/259 TF, 259 FF, 259 FS

[56] References Cited

UNITED STATES PATENTS

| | | |
|---|---|---|
| 3,020,988 | 2/1962 | Bransford ........................... 24/259 TF |
| 2,654,411 | 10/1953 | Bedford ............................. 151/41.75 |
| 2,236,850 | 4/1941 | Hansman ........................... 151/41.75 |
| 2,233,230 | 2/1941 | Tinnerman ........................ 151/41.75 |
| 2,323,690 | 7/1943 | Tinnerman ........................ 151/41.75 |

Primary Examiner—Edward C. Allen
Attorney—F. H. Henson and E. C. Arenz

[57] ABSTRACT

A U-shaped clip nut in which the base leg and nut leg are joined by a bight portion extending only across an intermediate part of the total width of the clip nut with clamping fingers being formed of the remaining width and being cantilevered at the free end of the nut leg and directed toward the base leg.

9 Claims, 6 Drawing Figures

PATENTED JUN 13 1972 3,669,170

WITNESSES
Theodore F. Wrobel
James F. Young

INVENTOR
Donald R. Schuster
BY Edward C. Arenz
ATTORNEY

U-SHAPED CLIP NUT

BACKGROUND OF THE INVENTION

1. Field of the Invention

The invention pertains to the art of U-shaped clip nuts adapted to be applied to the edge of an apertured work panel to provide a threaded retention device for a threaded member such as a sheet metal screw.

2. Description of the Prior Art

A variety of forms of the U-shaped clip nuts have been devised in the past as evidenced by U.S. Pat. Nos. 3,358,729, 3,145,753 and 2,672,905, for example.

One type of U-shaped clip nut is characterized as a wide panel range nut adapted to be used on single panels of different thicknesses, or on one or more panels, and function well in staying in place on the edge of the panel structure until the sheet metal screw is driven into the nut. The general structure of such nuts is similar to that shown in U.S. Pat. No. 2,672,905 in that relatively narrow opposite edge strips form the connection between the legs lying on opposite faces of the panel and provide the basic clamping force to retain the nut on the panel. The main disadvantage of such nuts is that they are relatively expensive as compared to so-called standard U-nuts, which are limited in their applicability to different thickness panel structures. The standard U-nut is simply a spring steel strip bent over upon itself with a helically edged aperture in the one leg and a detented aperture in the other leg, but which is devoid of any slits separating the intermediate portions of the legs from the edge portions. While as noted before the standard clip nut is relatively inexpensive as compared to the wide-range clip nuts, they are substantially more limited in their application as to panel thickness. If used on too thin a panel structure they tend to fall off, and if used on too thick a panel structure, they are hard to apply and often become so distorted as to fall off.

The clip nut of the present invention is intended to be: applicable to different panel structure thicknesses; less expensive than the so-called wide range nuts; installed on a panel reasonably easily; able to accommodate holes in the panels which are farther from the edge, and also holes very close to a bend of a flange; hold itself well upon a panel before the application of a sheet metal screw; and producible at a cost significantly lower than the cost of the commercially available wide panel range U-nuts of which I am aware.

SUMMARY OF THE INVENTION

In accordance with the currently preferred form of my invention, the U-shaped clip nut comprises a base leg and a nut leg which are integrally joined by a bight portion extending across only an intermediate portion of the total width of the clip nut, with the two opposite edge portions or strips of the nut leg occupying substantially the remaining width of the clip nut and serving as cantilevered fingers joined to the nut leg only in the vicinity of the free end of the nut leg, and directed toward the base leg at their free ends to provide extra clamping force between the two legs. The apertures in the opposite legs of the nut are provided substantially as close as is possible to the free or leading edges of the legs so that the nut will accommodate a hole in a panel a relatively long distance from the edge of the panel, as well as accommodating holes closely adjacent to the bend corner of a flanged panel. Additional features will be explained in some detail in connection with the drawing and its description.

DRAWING DESCRIPTION

DESCRIPTION OF THE PREFERRED EMBODIMENT

The clip nut of the invention is formed as a monolithic sheet metal clip which includes a base leg 10 and nut leg 12 which lie generally parallel to each other in spaced-apart relation and are integrally joined by a bight portion 14 occupying the intermediate portion of the width of the two legs.

Figure 1:
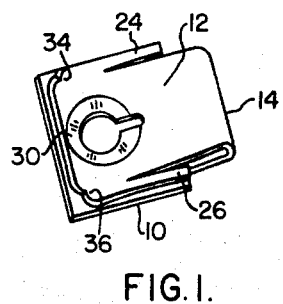
FIG. 1 is an isometric view of a clip nut according to the invention.
Figure 3:
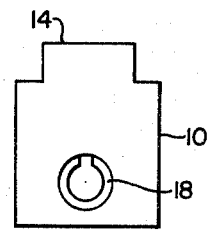
FIG. 3 is a face view of the base of the nut.
Figure 4:
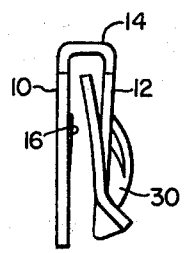
FIG. 4 is a left-hand edge view of the nut of FIG. 2.
Figure 2:
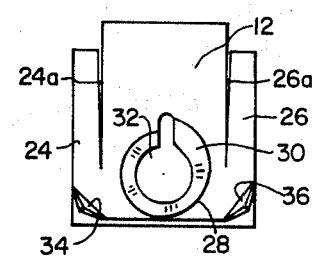
FIG. 2 is a face view of the nut leg of the nut.
Figure 5:
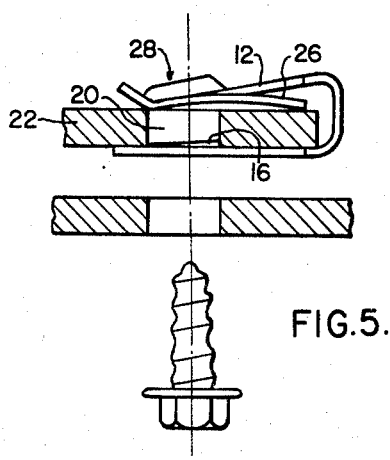
FIG. 5 is an exploded edge view showing the nut in place on a work panel before a facing panel and sheet metal screw are applied.
Figure 6:
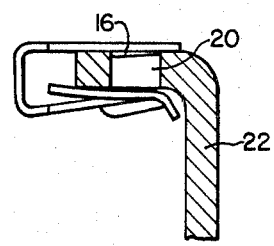
FIG. 6 is an edge view of a nut applied to an apertured flange in which the hole is close to the bend portion of the flanged panel.

The base leg 10 is substantially planar except for a retention detent 16 (FIG. 4) which takes the form of a raised lip on the inner face of the leg 10 along a part of the periphery of the hole 18 in the base leg. As shown in FIGS. 5 and 6, this detent seats in aperture 20 provided in the work panel 22 in the installed position of the clip nut. It will also be seen from FIG. 3 that the base leg is uninterrupted throughout its area by any slot means separating one portion thereof from another except for the hole 18 in the base leg.

The nut leg 12 includes the intermediate width portion also designated 12 and of substantially the same width as the bight 14, and opposite edge strips 24 and 25 separated by slits 24a and 26a from the inner portion of the leg. These edge portions serve as leaf spring fingers or cantilevered arms which are displaced out of the plane of a nut leg as a whole so that the free ends of the fingers are directed toward the base leg. The fingers are integrally joined to the nut leg in the vicinity of the nut impression generally designated 28.

The nut impression may take various forms, but in the form shown is a frustoconical embossment 30 provided with a generally centered hole 32, the edge of which throughout most of its extent extends helically to accommodate the threads of a sheet metal screw or other threaded member. This type of nut impression is of course conventional.

It will be noted that the nut impression 28 is disposed on the nut leg substantially as closely adjacent the free or leading edge of the nut leg as is possible. Thus, the base of the embossment of the nut impression is located such that the end edge of the nut leg is shown as being tangent to a point on the periphery of the base of the embossment.

The opposite corners of the free edge or leading edge of the nut leg are provided with upwardly inclined lead lips or chamfers 34 and 36 to aid in leading the open mouth of the clip nut onto the edge of the work panel 22. Providing these lead lips at only the corners of the nut leg permits locating the nut impression closer to the leading edge of the nut leg than if the lead lip extended across the width of the nut leg as is typically done.

By locating the nut impression 28 very close to the leading edge of the nut leg 12, it will be appreciated that, as seen in FIG. 5, the hole 20 in the work panel 22 may be located somewhat farther from the edge of the work panel upon which the nut is clipped than if the nut impression 28 were substantially centered in the length of the nut leg. For the same reason, and as may be seen in FIG. 6, when there is a limited distance between a hole 20 in a flange of a work panel 22 and the corner portion formed between the flange and main part of the panel, the clip nut according to the invention, may still be used.

It is considered that one significant feature of a clip nut according to the invention is the arrangement in which the bight portion joining the base leg and nut leg is formed between the inner portions of these legs, rather than being formed in the opposite edge strips as is typical with the wide panel range U-nuts commercially available. As a result of the arrangement according to the invention, with an overall width of approximately one-half inch, a bight width portion of approximately five-sixteenth inch has been found satisfactory. This is in contrast to a typical wide panel range "U" nut in which, with an overall width of approximately five-eighth inch, the total width of the two edge strips merging into the bight portions are approximately three-sixteenth inch. Since the clamping force of a clip nut on a panel is derived, in part, from the total bight width, with a given spring steel, it is possible to get good clamping and retention of the clip nut on the panel with a smaller clip nut according to my invention.

Another significant feature according to the invention is the provision of the clamping fingers which provide a lesser but highly effective clamping force to aid in retaining the clip nut on a work panel, particularly where the free end edges of the fingers engage a face of the work panel as shown in FIG. 5. Since in some applications of clip nuts the retention ability of the nut on a work panel before the sheet metal screw is applied is considered to be paramount, the aid in retention provided by the fingers is considered highly useful.

I claim as my invention:

1. A U-shaped clip nut, for attachment to a work panel having an aperture near the edge thereof, comprising:
   a base leg and a nut leg integrally joined by a bight portion extending across an intermediate part of the total width of the clip nut, with two opposite edge portions of the nut leg constituting fingers joined to said nut leg only in the vicinity of the free end of the nut leg, and directed toward said base leg at their free ends,
   the planes of said base leg and said nut leg generally paralleling the plane of said work panel as installed so that ends of both of said legs opposite said bight portion engage the respectively opposite faces of said panel.
   said nut leg including a thread-engaging hole adjacent its end opposite said bight portion,
   said base leg including a clearance opening aligned with said thread-engaging hole and further including detent means at the side of said clearance opening closest to said bight portion and projecting toward said nut leg so that said detent means is adapted to be received in said aperture of said work panel to properly locate and hold said clip nut to said work panel.

2. A clip nut according to claim 1 wherein:
said opposite edge portions occupy substantially the remaining width of said total width.

3. A clip nut according to claim 1 wherein:
said base leg is substantially planar throughout its area and is uninterrupted throughout its extent, save for said clearance hole therein.

4. A clip nut according to claim 1 wherein said nut includes:
said thread-engaging hole formed generally at the mouth of a frustoconical embossment in said nut leg, said embossment being located on said nut leg so that the end edge of said nut leg is closely adjacent to being tangent to a point on the periphery of the base of said embossment.

5. A U-shaped clip nut for attachment to a work panel having an aperture near the edge thereof, comprising:
   a base leg having a clearance opening and detent means adjacent the periphery of said opening;
   a nut leg having a thread-engaging hole therein adjacent its free end and in general registry with said base leg opening;
   a resilient bight portion integrally joining said base leg and said nut leg and tending to hold said legs in a predetermined spaced-apart relation; and
   said nut leg comprising an inner portion extending for substantially the length of said nut leg and having substantially its width integrally joined to said bight portion, said nut leg further comprising opposite edge leaf spring fingers integral with said inner portion in the vicinity of said thread-engaging hole and being inclined throughout their length to place their free ends closer to said base leg than the corresponding intervening portion of said nut leg, so that a material clamping effect upon said work panel is imposed between said fingers and said base leg to draw said detent means into said work panel aperture with said clip nut installed with the planes of said base leg and said nut leg generally paralleling the plane of said work panel.

6. A clip nut according to claim 5 wherein:
said base leg is substantially planar save for said detent means, and is uninterrupted throughout its area by means separating one portion thereof from another except for said base leg opening.

7. A clip nut according to claim 5 including:
upwardly inclined lead corners at the lead edge of said nut leg.

8. A clip nut according to claim 5 wherein:
the free ends of said fingers terminate short of said bight.

9. A clip nut according to claim 5 wherein:
said thread-engaging hole is formed generally at the mouth of a frustoconical embossment; and
said embossment is located on said inner portion so that the end edge of said nut is closely adjacent to being tangent to a point on the periphery of the base of said embossment.

* * * * *